US006061750A

United States Patent [19]
Beardsley et al.

[11] Patent Number: 6,061,750
[45] Date of Patent: May 9, 2000

[54] FAILOVER SYSTEM FOR A DASD STORAGE CONTROLLER RECONFIGURING A FIRST PROCESSOR, A BRIDGE, A SECOND HOST ADAPTOR, AND A SECOND DEVICE ADAPTOR UPON A SECOND PROCESSOR FAILURE

[75] Inventors: Brent C. Beardsley; Matthew Joseph Kalos, both of Tucson; Ronald Robert Knowlden, Vail, all of Ariz.

[73] Assignee: International Business Machines Corporation, Armonk, N.Y.

[21] Appl. No.: 09/026,622

[22] Filed: Feb. 20, 1998

[51] Int. Cl.[7] .............................. G06F 13/14; G06F 11/00
[52] U.S. Cl. ................................ 710/74; 710/10; 710/17; 711/113; 711/114; 714/10
[58] Field of Search ................................... 714/11, 3, 5, 8, 714/9, 10; 711/112, 113, 114; 710/8, 10, 17, 74

[56] References Cited

U.S. PATENT DOCUMENTS

| | | | |
|---|---|---|---|
| 4,916,605 | 4/1990 | Beardsley et al. | 711/162 |
| 5,136,498 | 8/1992 | McLaughlin et al. | 364/184 |
| 5,303,244 | 4/1994 | Watson | 714/5 |
| 5,426,774 | 6/1995 | Banerjee et al. | 714/16 |
| 5,437,022 | 7/1995 | Beardsley et al. | 714/6 |
| 5,530,852 | 6/1996 | Meske, Jr. et al. | 709/206 |
| 5,546,535 | 8/1996 | Stallmo et al. | 714/9 |
| 5,559,764 | 9/1996 | Chen et al. | 369/30 |
| 5,586,291 | 12/1996 | Lasker et al. | 711/113 |
| 5,617,530 | 4/1997 | Stallmo et al. | 714/6 |
| 5,636,359 | 6/1997 | Beardsley et al. | 711/122 |
| 5,640,530 | 6/1997 | Beardsley et al. | 711/113 |
| 5,682,509 | 10/1997 | Kabenjian | 710/129 |
| 5,790,775 | 8/1998 | Marks et al. | 714/9 |
| 5,819,054 | 10/1998 | Ninomiya et al. | 710/128 |
| 5,878,204 | 3/1999 | Kobayashi et al. | 714/9 |

OTHER PUBLICATIONS

David A. Patterson, et al., "A Case for Redundant Arrays of Inexpensive Disks (RAID)", *Sigmod Record, ACM Press*, vol. 17, No. 3, Sep. 1988, pp. 109–116.

"Shared Disk, UNIX–Based, Cluster File System", *IBM Technical Disclosure Bulletin*, vol. 37, No. 06B, Jun. 1994, pp. 209–210.

*Primary Examiner*—Thomas C. Lee
*Assistant Examiner*—Ilwoo Park
*Attorney, Agent, or Firm*—David W. Victor; Konrad Raynes & Victor LLP

[57] ABSTRACT

Disclosed is a storage controller for interfacing between a plurality of host systems and direct access storage devices (DASDs). The storage controller includes a bridge, a first host adaptor, and a first device adaptor that are configured to communicate with a first processor. A first DASD is linked to the first device adaptor. The bridge interfaces the first processor, the first host adaptor, and the first device adaptor. The storage controller further includes a second host adaptor and a second device adaptor that are configured to communicate with a second processor. A second DASD is linked to the second device adaptor. The bridge further interfaces the second processor, the second host adaptor, and the second device adaptor. After configuration, an input/output (I/O) request from at least one of the host systems is directed to the first DASD via the first host adaptor, the first processor, and the first device adaptor. An I/O request from at least one of the host systems to the second DASD is directed via the second host adaptor, the second processor, and the second device adaptor. Upon determining that the second processor has failed, the first processor configures the second host adaptor and second device adaptor to communicate with the first processor. After configuration in response to determining that the second processor has failed, an I/O request from at least one of the host systems to the second DASD is transferred via the second host adaptor, the first processor, and the second device adaptor.

19 Claims, 4 Drawing Sheets

FAILOVER SYSTEM FOR A DASD STORAGE CONTROLLER RECONFIGURING A FIRST PROCESSOR, A BRIDGE, A SECOND HOST ADAPTOR, AND A SECOND DEVICE ADAPTOR UPON A SECOND PROCESSOR FAILURE

CROSS-REFERENCE TO RELATED APPLICATIONS

This application is related to the co-pending and commonly-assigned U.S. patent application, Ser. No. 09/026,620, filed on the same date herewith, still pending, by Brent C. Beardsley, Carl E. Jones, and Forrest L. Wade, entitled "Bridge Failover System," [attorney's docket number TU997082], which application is incorporated herein in its entirety by reference.

BACKGROUND OF THE INVENTION

1. Field of the Invention

The present invention relates to a storage controller for interfacing between a host system and a direct access storage device (DASD) system and, in preferred embodiments, a storage controller including at least two processors, wherein each processor can separately control the flow of data between all attached host systems and the DASDs.

2. Description of the Related Art

In a large distributed computer system, a plurality of host computers and devices are typically connected to a number of direct access storage devices (DASDs) comprised of hard disk drives (HDDs). The DASDs may be organized in a redundant array of independent disks, i.e., a RAID array. A RAID array is comprised of multiple, independent disks organized into a large, high-performance logical disk. A controller stripes data across the multiple disks in the array and accesses the disks in parallel to achieve higher data transfer rates. However, utilizing multiple disks in an array increases the risk of failure. The solution in the art is to employ redundancy in the form of error-correcting codes to tolerate disk failures. The arrangement and organization of RAID arrays is described in Peter M. Chen, Edward K. Lee, Garth A. Gibson, Randy H. Katz, and David A. Patterson, "RAID: High-Performance, Reliable Secondary Storage," ACM Computing Surveys, Vol. 26, No. 2, June 1994, which is incorporated herein by reference in its entirety.

Not only is there a risk associated with the failure of a hard disk drive in a DASD system such as a RAID array, but there is also a risk of failure at a point within a storage controller which controls read and write operations between host computers and the DASDs. The conventional storage controller is typically designed to handle hardware failures. One such storage control designed to handle certain hardware failures is the storage controller utilized in the International Business Machine Corporation's (IBM) 3990 Model 3 system. This storage controller has two storage clusters, each of which provides for selective connection between a host computer and a DASD. Each cluster is on a separate power boundary. Further, a non-volatile storage unit (NVS) is associated with each cluster. The NVS is a memory array supported by a battery backup system. The NVS stores back-up copies of modified data in the event of a hardware failure within the storage controller while data is being written to a DASD. The NVS provides a storage back-up that is as secure as writing the data to a magnetic disk. Failback systems for storage controllers are described in U.S. Pat. Nos. 5,636,359, 5,437,022, 5,640,530, and 4,916,605, all of which are assigned to IBM, the assignee of the subject application, and all of which are incorporated herein by reference in their entirety.

In U.S. Pat. Nos. 5,437,022 and 5,640,530, as with the IBM 3990, model 3, the storage controller is comprised of two clusters, wherein each cluster has a cache and a NVS. The cache buffers frequently used data. When a request is made to write data to a DASD attached to the storage controller, the storage controller may cache the data and delay writing the data to a DASD. Caching data can save time as writing operations involve time consuming mechanical operations. The cache and NVS in each cluster can intercommunicate, allowing for recovery and reconfiguration of the storage controller in the event that one of the memory elements is rendered unavailable. For instance, if one cluster and its cache fails, the NVS in the other cluster maintains a back-up of the cache in the failed cluster.

In one caching operation, referred to as DASD fast write, data buffered in the cache is backed-up in the NVS. Thus, two copies of data modifications are maintained, one in the cache and another in the NVS. DASD fast write is typically used for data that will be written to the DASD. If the data to be written to the DASD is present in the cache, instead of writing the data to the DASD, the controller copies the data into the cache and NVS without having to interrupt processing to immediately write to the DASD. If the data to be written is not present in the cache, then the data is written to the DASD and cache simultaneously and immediately. Another caching operation, referred to as cache fast write, involves writing data to the cache without using the NVS. Cache fast write is intended for data that is not needed for job completion or that can be easily reconstructed.

Notwithstanding, the storage controller disclosed in U.S. Pat. Nos. 5,437,022 and 5,640,530 comprises a complex and custom hardware structure, wherein each storage path in a cluster requires its own custom microcontroller and microcode. In fact, U.S. Pat. No. 5,640,530, at column 6, lines 50–57, makes note of the added complexity of the system which requires that each microcontroller maintains and updates information concerning the location of data for read, writes and other data transfers.

Moreover, data transfer rates in a storage controller are determined by the data-transfer rates at each connectivity point within the controller. The speed at which processed data travels between a host and DASDs, such as a RAID array, is restricted by the maximum data-transfer rate possible through each peripheral interface. In current systems, data transfer rates are significantly degraded when a cluster fails, because the remaining cluster must then handle all data transfers. In storage control systems which involve complex arrangements to handle failovers, such as the system disclosed in U.S. Pat. Nos. 5,437,022 and 5,640,530, the complexity of the system can further degrade data transfer rates when one cluster must take over data transfers previously handled by the failed clusters.

Yet further, in some prior art systems, the NVS and storage controller have single points of failure which can disable the entire cache and NVS, resulting in substantial performance degradation.

SUMMARY OF THE INVENTION

To address the shortcomings in the prior art described above, preferred embodiments of the present invention provide a storage controller for interfacing between a plurality of host systems and direct access storage devices (DASDs). The storage controller includes a bridge, a first host adaptor, and a first device adaptor that are configured to communicate with a first processor. A first DASD is linked to the first device adaptor. The bridge interfaces the first processor, the first host adaptor, and the first device adaptor. The storage controller further includes a second host adaptor and a second device adaptor that are configured to communicate with a second processor. A second DASD is linked to the second device adaptor. The bridge further interfaces the second processor, the second host adaptor, and the second device adaptor. After configuration, an input/output (I/O) request from at least one of the host systems is directed to the first DASD via the first host adaptor, the first processor, and the first device adaptor. An I/O request from at least one of the host systems to the second DASD is directed via the second host adaptor, the second processor, and the second device adaptor. Upon determining that the second processor has failed, the first processor configures the second host adaptor and second device adaptor to communicate with the first processor. After configuration in response to determining that the second processor has failed, an I/O request from at least one of the host systems to the second DASD is transferred via the second host adaptor, the first processor, and the second device adaptor.

It is an object of the present invention to provide a storage controller including a multi-processor architecture to direct data from host systems to DASDs.

It is a further object that each of the processors be able to reconfigure the host adaptors and device adaptors associated with the other processor to address the configuring processor. In this way, data can be rerouted away from a failed processor toward a functioning processor.

BRIEF DESCRIPTION OF THE FIGURES

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment and Architecture of the Storage Controller

Figure 1:
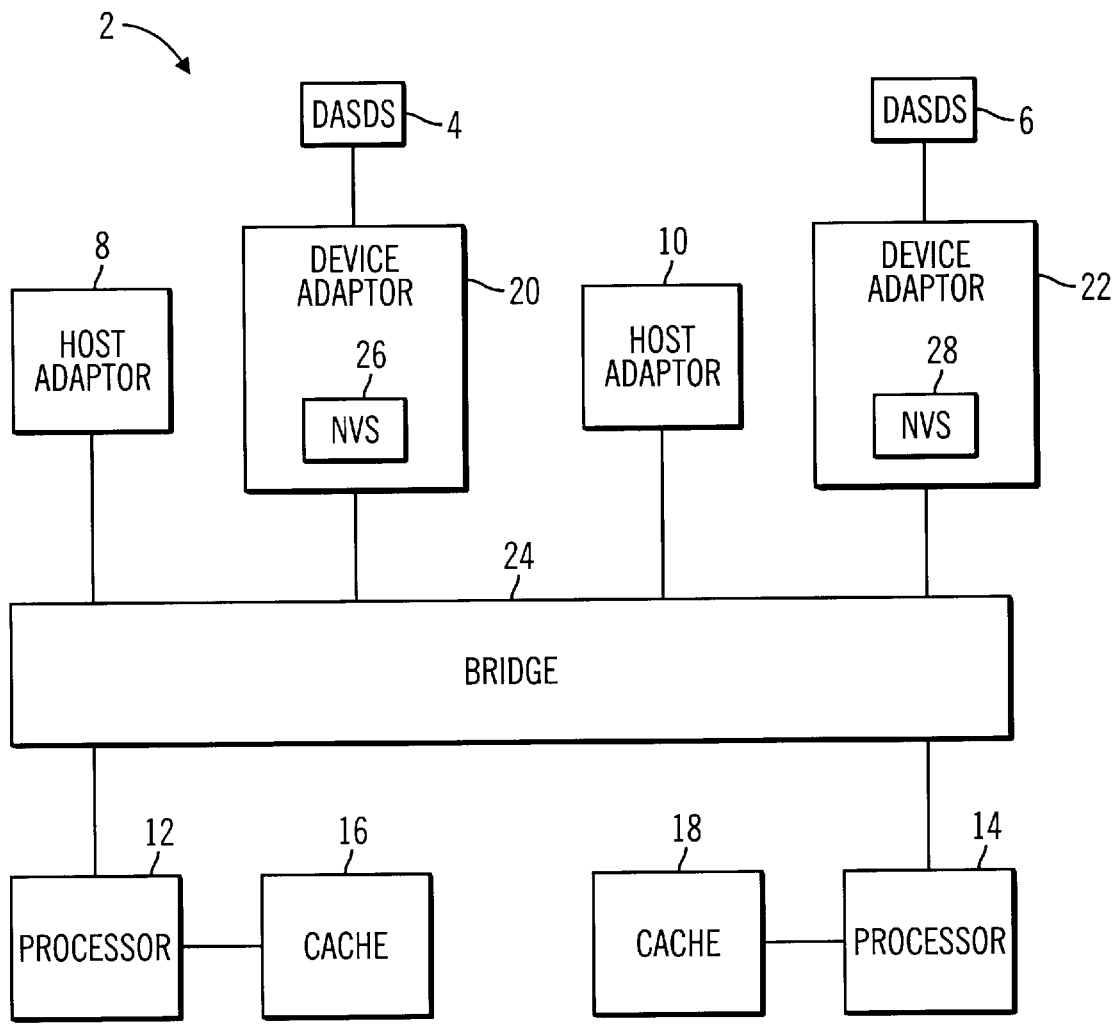
FIG. 1 illustrates a block diagram of the components and architecture of a preferred embodiment of a storage controller in accordance with the present invention.

FIG. 1 illustrates a block diagram of the components and architecture of a preferred embodiment of a storage controller 2 which interfaces between host systems (not shown) and DASDs 4, 6. In preferred embodiments, the DASDs are magnetic storage units such as hard disk drives. The host systems are connected to host adaptors 8, 10 via a bus interface (not shown), such as the SCSI bus interface. The host systems may be connected to the host adaptors 8, 10 via a dual bus host or a single bus host interface.

In preferred embodiments, the storage controller 2 includes processors 12, 14 caches 16, 18, device adaptors 20, 22, and a bridge 24 which provides communication between the processors 12, 14, the device adaptors 20, 22, and the host adaptors 8, 10. The device adaptors 20, 22 provide the interface with the DASDs 4, 6. The bridge 24 includes logic to allow either processor 12 or 14 to assume control of the host adaptors 4, 6 and device adaptors 20, 22 and direct communication toward the controlling processor. Further, either processor 12, 14 can configure the bridge 24 to fence off the other processor from receiving data and commands from the host adaptors 8, 10 and device adaptors 20, 22, thereby allowing one processor 12, 14 to handle all communication over the bridge 24. The architecture and operation of the bridge 24 to allow either processor 12, 14 to operate as a master for the bridge 24 is described in co-pending and commonly-assigned U.S. patent application, Ser. No. 09/026,620, still pending, entitled "[PCI to PCI] Bridge Failover System," [attorney's docket number TU997082], which was incorporated herein by reference in its entirety above. In preferred embodiments, the processors 12, 14 are symmetrical multi-processors, such as the IBM RS/6000 processor. The caches 16, 18 may be external to the processors 12, 14 or included in the processor 12, 14 complex. The caches 16, 18 buffer information such as data writes to the DASDs 4, 6.

In preferred embodiments, the device adaptors 20, 22 include a non-volatile storage unit (NVS) 26, 28. The NVSs 26, 28 consist of a random access electronic storage with a battery backup. Storage time for a fully charged battery may last a couple of days. In preferred embodiments, the NVS battery is continuously charged whenever primary power is applied during normal operations. The cache 16, 18, on the other hand, is a volatile storage unit that cannot maintain data in the event of a power failure. When data is written to the DASDs 4, 6, the processor 12, 14 copies the data to the cache 16, 18 and the NVS 26, 28 in the device adaptor 20, 22 connected to the DASD 4, 6 in which the data is to be written. The NVSs 26, 28 buffer data so the device adaptors 20, 22 do not have to immediately write the data to their attached DASDs 4, 6. Each host adaptor 8, 10 and device adaptor 20, 22 may comprise a shared input/output bay to receive multiple cards. In such case, each host adaptor 8, 10 card would provide connections to various host systems and each device adaptor 20, 22 card would provide connections to a group of DASDs 4, 6.

In preferred embodiments, the device adaptors 20, 22 employ the Serial Storage Architecture (SSA) developed by IBM. Further, in preferred embodiments, the DASDs 4, 6 comprise a group of multiple hard disk drives interconnected in a loop topology. In preferred embodiments, each DASD 4, 6 group of hard disk drives includes a RAID array. In preferred embodiments, RAID 5 is used. In RAID 5, parity is striped uniformly over all of the disks. The advantage of RAID 5, along with RAID 1 and 3, is that the RAID array remains operational even if one disk within the RAID array fails.

Figure 2:
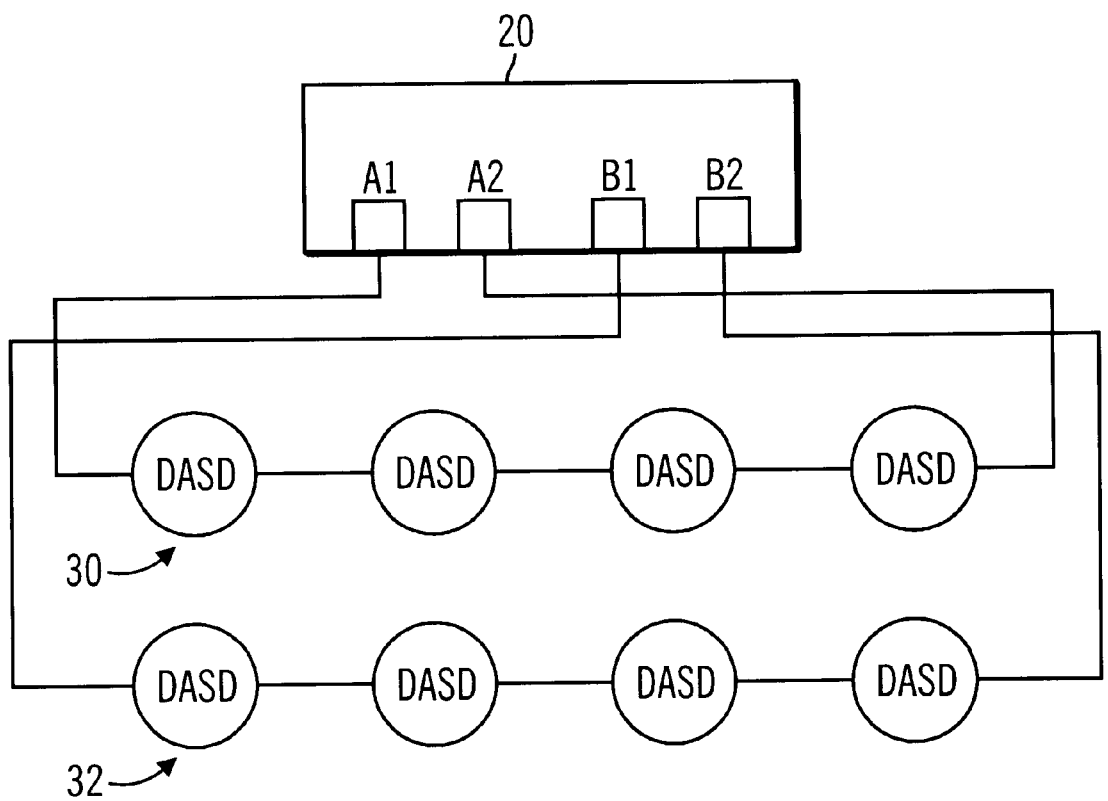
FIG. 2 illustrates a block diagram of a preferred embodiment of the arrangement of DASDs and their attachment to components of the storage controller in accordance with the present invention.

FIG. 2 shows a preferred embodiment for attaching a device adaptor 20 to loops 30, 32. In the exemplar of FIG. 2, each loop 30, 32 includes four DASD devices. The device adaptor 20 connects to loop 30 via ports A1 and A2 and to loop 32 via ports B1 and B2. The DASDs within a loop 30, 32 are connected to each other, such that when a device adaptor 20, 22 accesses a DASD within a loop 30, 32, the device adaptor 20, 22 communicates through the intermediary DASDs between the device adaptor 20, 22 and the DASD to be accessed.

In alternative embodiments, a loop 30, 32 of DASDs could include more or less DASD devices than shown in FIG. 2. Moreover, the topology of the arrangement of the DASD devices may differ, e.g., strings, complex switch strings, and cyclical paths. In yet further embodiments, the device adaptors 20, 22 may utilize different interface standards, such as SCSI. Still further, each loop 30, 32 could include multiple RAID arrays, depending on the total number of DASDs in the loop. Different arrangements for connecting device adaptors to groups of disks are described in "A Practical Guide to Serial Storage Architecture for AIX" (IBM document SG24-4599-00, International Business Machines Corporation, copyright 1996), which is incorporated herein by reference in its entirety.

In preferred embodiments, each RAID array in a group of DASDs 4, 6 appears to the host adaptors 8, 10 as a single logical unit number (LUN). The processors 12, 14 views data in the DASDs 4, 6 in a data format such as the fixed block addressing (FBA) format, Count-Key-Data (CKD) format or some other data format known in the art. Logic in the processors 12, 14 maps data in the DASDs 4, 6 to a single LUN format which is presented to the host adaptors 8, 10. A host system views a LUN as a hard disk drive. In embodiments where a RAID-5 array is used, the processors 12, 14 may map the RAID 5 to a multi-LUN format for presentation to the host adaptors 8, 10, where the array appears as n−1 individual drives to the host system, such that n is the number of data drives installed in the array. In alternative embodiments, multi-LUN format may be presented even if RAID 5 is not used. Also, the number of individual drives presented to the host system is independent from the number of drives in the array. In this way, the processors 12, 14 manage how data in the DASDs 4, 6 is presented to the host systems. In alternative embodiments, some of the mapping operations may be performed by the device adaptors 20, 22.

Figure 3:
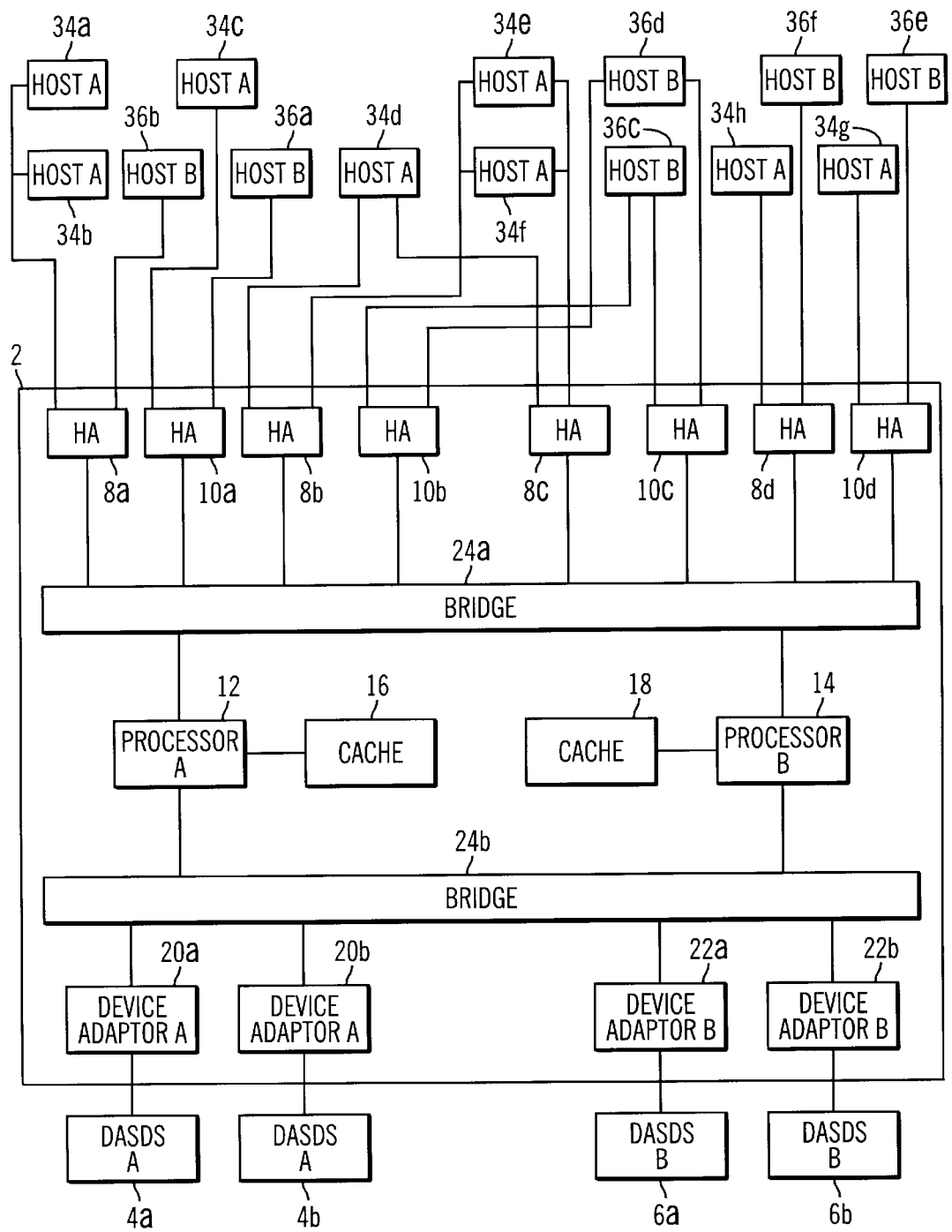
FIG. 3 illustrates a further embodiment of a storage controller in accordance with the present invention.

FIG. 3 illustrates a further embodiment of the storage controller 2, including eight host adaptors (HA) 8a, b, c, d and 10a, b, c, d, and four device adaptors 20a, b and 22a, b. In preferred embodiments, each host adaptor 8a, b, c, d and 10a, b, c, d has two independent, separately addressable ports, e.g., two SCSI ports. Each port on a host adaptor (HA) is linked to a separate host system and can separately route data toward one of the processors 12, 14. For instance, data communicated toward one port of a host adaptor (HA) can be routed toward processor 12 and the other port toward processor 14. In preferred embodiments, the two separately addressable ports are packaged on a single adaptor card.

Each device adaptor 20a, b and 22a, b is connected to a group of DASDs 4a, b and 6a, b, respectively. The device adaptors 20a, b and 22a, b could include an NVS as described above with respect to the device adaptors 20, 22 in FIG. 1 to buffer data being written to the DASDs. Bridge 24a provides communication between the host adaptors 8a, b, c, d and 10a, b, c, d and the processors 12, 14 and bridge 24b provides communication between the processors 12, 14 and the device adaptors 20a, b and 22a, b. The bridges 24a, b have the same architecture as the bridge 24 described in FIG. 1, wherein either processor 12, 14 can reconfigure the bridges 24a, b to assume control of all the host adaptors and device adaptors attached to the bridges 24a, b. Host systems 34a, b, c, g, h and 36a, b, e, f attach to their respective host adaptors via a single bus host interface whereas host systems 34d, e, f and 36c, d attach to their respective host adaptors via a dual bus host interface. The host systems attached via a dual bus host interface can communicate to an alternative host adaptor in the event that one of the host adaptors to which they are linked fails. Host systems connected via a single bus host to only one host adaptor cannot access the DASDs 4a, b, and 6a, b should the single host adaptor to which they are connected fail.

In the embodiment of FIG. 3, the components of the storage controller 2 are separated into an "A" and "B" side, wherein the components on the "A" side are managed by processor 12 and the components on the "B" side are managed by processor 14. Host adaptors 8a, d and 10a, d interface with one "A" host and "B" host. These adaptors would map data from the "B" hosts to the "B" side processor 14, and data from the "A" hosts to the "A" side processor 12. In this way, each port of the host adaptor card may be separately addressed and mapped toward either processor 12, 14. As part of configuring the storage controller 2 during initialization, a relationship is established between logical unit number (LUN)s and a storage area on the DASDs 4a, b, 6a, b. A number of LUNs could be associated with the "A" and "B" sides. Each host system 34a, b, c, d, e, f, g, h and 36a, b, c, d, e is separately configured to associate with one or more LUNs of the A and/or B type, thereby allowing the host systems associated with a particular LUN to access all storage areas on the DASDs associated with such LUNs.

When both processors 12, 14 are operating, processor 12 handles all I/O request for the A-type LUNs, which involves requests from host systems 34a, b, c, d, e, f, g, h to DASDs 4a, b via host adaptors (HA) 8a, b, c, d and device adaptors 20a, b. Likewise, processor 14 handles all I/O requests for B-type LUNs, which involves host systems 36a, b, c, d, e, f, to DASDs 6a, b via host adaptors (HA) 10a, b, c, d and device adaptors 22a, b. If one processor, such as processor 12, fails, the other processor 14 can reconfigure the bridges 24a, b, host adaptors 6a, b, c, d, and device adaptors 20a, b to communicate only with processor 14 as described in the copending and commonly-assigned U.S. patent application, Ser. No. 09/026,620, still pending, entitled "[PCI to PCI] Bridge Failover System," [attorney's docket number TU997082], which application was incorporated herein by reference in its entirety above.

In yet further embodiments, a host system could be configured to access both A and B type LUNs. In such case, the host would be connected to one host adaptor 8a, b, c, d associated with the A LUNs and another host adaptor 10a, b, c, d associated the B LUNs. Such a host system would interface with a dual host adaptor to connect to one A type host adaptor and a B type host adaptor.

When a host system, such as host 34b in FIG. 3, writes data to an A-type LUN, the host adaptor 8a will direct the data write to the processor 12. Processor 12 will maintain a copy of the data in the cache 16 and may back-up the write data in the NVS in the device adaptor 20a. In this way, the NVS associated with the device adaptor 20a provides a back-up if the cache 16 fails. The processor 12 will then direct the write data to the device adaptor 20a for storage in DASDs 4a.

Failover Method

Figure 4A:
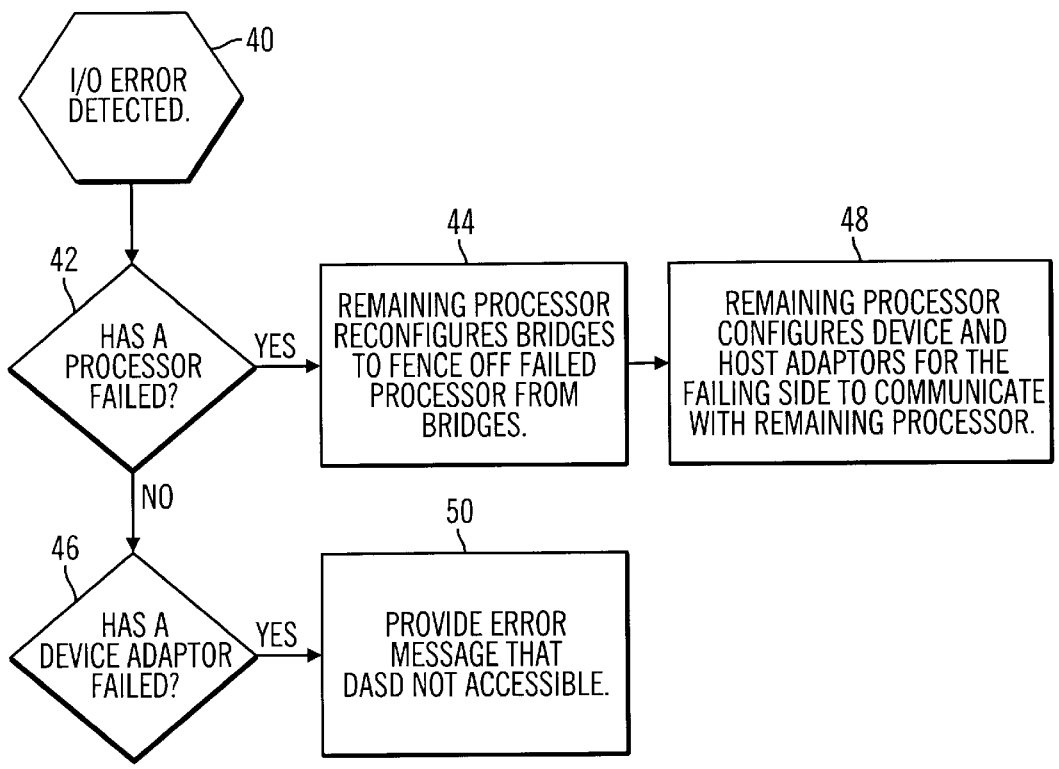
FIG. 4a is a flowchart that illustrates general logic implemented within the storage controller to handle a failure of a hardware component within the storage controller in accordance with a preferred embodiment of the present invention.
Figure 4B:
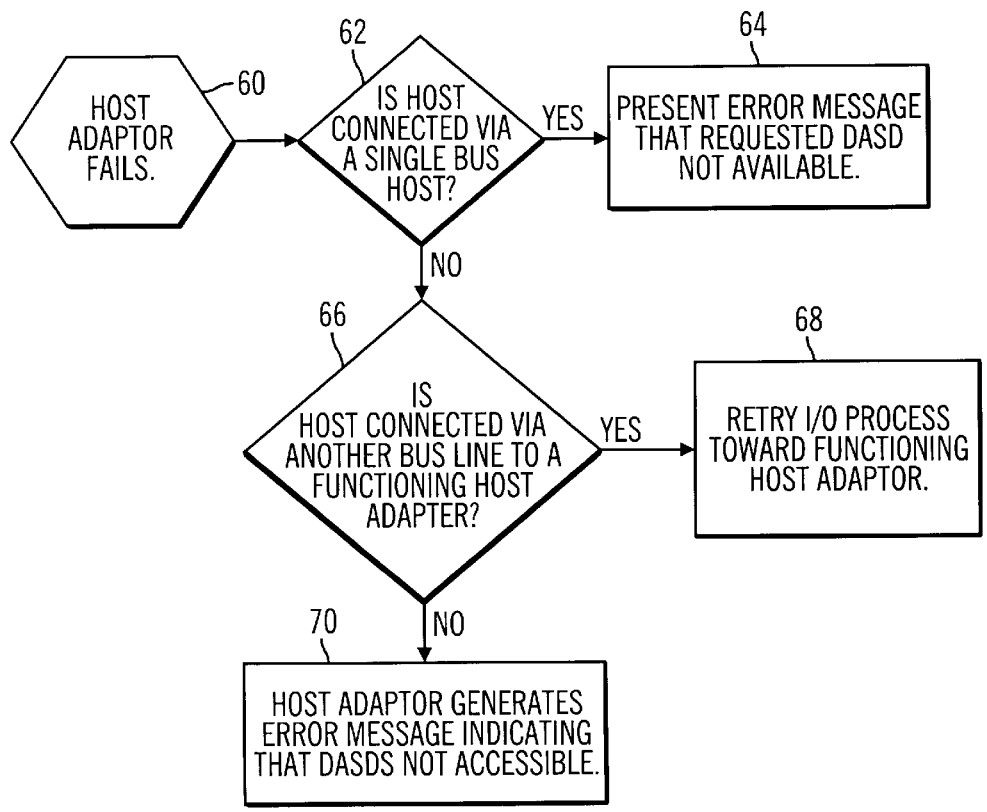
FIG. 4b is a flowchart that illustrates general logic implemented within a host system to handle a failure of a host adaptor to which the host system is attached in accordance with a preferred embodiment of the present invention.

FIGS. 4a and 4b are flowcharts illustrating the logic used to control failover in particular situations. The logic of FIG.

4a may be implemented in a BIOS unit, system software, the firmware of the processors 12, 14 and/or as hardware logic (e.g., circuits and gates) throughout the storage controller 2. The logic of FIG. 4b is implemented within the host systems as software or hardware logic (e.g., circuits and gates). Those skilled in the art will recognize that this logic is provided for illustrative purposes only and that different logic may be used to accomplish the same results.

FIG. 4a illustrates an embodiment of logic for handling a failure within the system shown in FIG. 3. Block 40 represents an error occurring when an I/O attempt occurs. Control transfers to block 42 which is a decision block represents a functioning processor 14 determining if the other processor 12 has failed. If so, control transfers to block 44; otherwise control transfers to block 46. Block 44 represents the functioning processor 14 reconfiguring the bridges 24a, b to fence off the failed processor 12 from the bridges 24a, b. Control then transfers to block 48 which represents the functioning processor 10 configuring the host adaptors 8a, b, c, d and device adaptors 20a, b associated with the failed processor 12 to address the functioning processor 14 and not the failed processor 12.

Block 46 represents a processor 12, 14 determining whether a device adaptor has failed. If so, control transfers to block 50 which represents the processor 12, 14 fencing off the failed device adaptor and generating an error message to the host system attempting to access the DASDs attached to the failed device adaptor.

FIG. 4b is a flowchart illustrating logic implemented in a host system for handling a failure in a host adaptor to which the host system is attached. At block 60, a host adaptor fails. Control transfers to block 62 which represents the host system attached to the failed host adaptor determining if it is connected via a single host bus. If so, control transfers to block 64; otherwise control transfers to block 66. Block 64 represents the host system generating an error message that the DASD to which the I/O request is directed is not accessible. In such case, all host systems linked only to the failed adaptor cannot access data maintained in the DASDs 4a, b, 6a, b. Block 66 represents the host system determining if it is connected to an alternative functioning host adaptor via another bus line, i.e., the host system is linked to a dual bus host interface such as hosts 34d, e, f and 36c, d in FIG. 3. If so, control transfers to block 68; otherwise control transfers to block 70. Block 68 represents the host system retrying the I/O process toward the functioning host adaptor. Block 70 represents the host adaptor generating an error message indicating that the DASDs to which the I/O request is directed are not accessible.

Conclusion

This concludes the description of the preferred embodiments of the invention. The following describes some alternative embodiments for accomplishing the present invention.

Preferred embodiments of the storage controller are described with respect to a storage controller having a specific dual processor arrangement. However, those skilled in the art will recognize that the failover procedure could apply to storage controllers having different components and a different architecture from the storage controller described with respect to FIGS. 1 and 3. For instance, the storage controller may include additional device adaptors, host adaptors, DASDs, and processors, and a different interface arrangement therebetween.

Still further, the DASDs are described as being magnetic units. However, in alternative embodiments the DASDs could be optical memory devices, holographic units, etc. Yet further, a group of DASDs connected to a single device adaptor could be organized into a plurality of RAID arrays. Still further, the components of the storage controller, including the host adaptors, bridges, device adaptors, and DASDs and functions performed thereby may be implemented with hardware logic (e.g., gates and circuits), firmware or a combination thereof. Moreover, events may occur at times different than the order presented in the flowcharts of FIGS. 4a and 4b.

In summary, preferred embodiments in accordance with the present invention provide a storage controller for interfacing between a plurality of host systems and direct access storage devices (DASDs). The storage controller includes a bridge, a first host adaptor, and a first device adaptor that are configured to communicate with a first processor. A first DASD is linked to the first device adaptor. The bridge interfaces the first processor, the first host adaptor, and the first device adaptor. The storage controller further includes a second host adaptor and a second device adaptor that are configured to communicate with a second processor. A second DASD is linked to the second device adaptor. The bridge further interfaces the second processor, the second host adaptor, and the second device adaptor. After configuration, an input/output (I/O) request from at least one of the host systems is directed to the first DASD via the first host adaptor, the first processor, and the first device adaptor. An I/O request from at least one of the host systems to the second DASD is directed via the second host adaptor, the second processor, and the second device adaptor. Upon determining that the second processor has failed, the first processor configures the second host adaptor and second device adaptor to communicate with the first processor. After configuration in response to determining that the second processor has failed, an I/O request from at least one of the host systems to the second DASD is transferred via the second host adaptor, the first processor, and the second device adaptor.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for a storage controller to interface between a plurality of host systems and direct access storage devices (DASDs), comprising the steps of:

(a) configuring a bridge, a first host adaptor, and a first device adaptor to communicate with a first processor, wherein a first DASD is linked to the first device adaptor, and wherein the bridge interfaces the first processor, the first host adaptor, and the first device adaptor;

(b) configuring the bridge, a second host adaptor, and a second device adaptor to communicate with a second processor, wherein a second DASD is linked to the second device adaptor, and wherein the bridge interfaces the second processor, the second host adaptor, and the second device adaptor;

(c) directing an input/output (I/O) request from at least one of the host systems to the first DASD via the first host adaptor, the first processor, and the first device adaptor;

(d) directing an I/O request from at least one of the host systems to the second DASD via the second host adaptor, the second processor, and the second device adaptor;

(e) determining whether the second processor has failed; and (f) configuring, with the first processor, the bridge, the second host adaptor, and second device adaptor to communicate with the first processor, wherein after configuration in response to determining that the second processor has failed, an I/O request from at least one of the host systems to the second DASD is transferred via the second host adaptor, the first processor, and the second device adaptor.

2. The method of claim 1, further comprising the step of configuring the bridge to block communication between the second processor and the bridge upon determining that the second processor has failed.

3. The method of claim 1, wherein the first and second device adaptors each include a non-volatile storage unit (NVS) and further including the steps of buffering data written to the first DASD in the NVS within the first device adaptor and buffering data written to the second DASD in the NVS within the second device adaptor.

4. The method of claim 1, further including the steps of:
determining with the first processor whether the first device adaptor has failed when at least one of the host systems directs a request toward the first DASD; and
generating a message to at least one of the host systems directing a request toward the first DASD to be communicated via the failed first device adaptor indicating that the first DASD is inaccessible after determining that the first device adaptor has failed.

5. The method of claim 1, wherein the bridge is comprised of a first bridge that provides communication between the host adaptors and the processors and a second bridge that provides communication between the processors and the device adaptors.

6. The method of claim 1, wherein the first DASD comprises a first group of at least one DASD and the second DASD comprises a second group of at least one DASD, further including the steps of:
mapping, with the first processor, data in the first group of DASDs to a format that at least one of the host systems interprets as a first logical unit number (LUN);
mapping, with the second processor, data in the second group of DASDs to a format that at least one of the host systems interprets as a second LUN;
directing data from at least one of the host systems to the first processor via the first host adaptor and the bridge, wherein the first processor maps the data routed thereto to an addressable area in the first group of DASDs;
directing data from at least one of the host systems to the second processor via the second host adaptor and the bridge, wherein the second processor maps the data routed thereto to an addressable area in the second group of DASDs, wherein after configuration in response to determining that the second processor has failed, an I/O request from at least one of the host systems to the second group of DASDs is routed via the second host adaptor to the first processor, wherein the first processor maps the data routed to the second group of DASDs to the addressable area in the second group of DASDs.

7. A storage controller for interfacing between a plurality of host systems and direct access storage devices (DASDs), comprising:

(a) a first host adaptor;

(b) a first device adaptor;

(c) a first DASD linked to the first device adaptor;

(d) a first processor;

(e) a bridge, wherein the first processor, first host adaptor, and the first device adaptor interface via a bridge, wherein an input/output (I/O) request from at least one of the host systems is directed to the first DASD via the first host adaptor, the first processor, and the first device adaptor;

(f) a second host adaptor;

(g) a second device adaptor;

(h) a second DASD linked to the second device adaptor; and (i) a second processor in communication with the second host adaptor and the second device adaptor via the bridge, wherein an input/output (I/O) request from at least one of the host systems is directed to the second DASD via the second host adaptor, the second processor, and the second device adaptor, wherein the first processor is capable of determining whether the second processor has failed, wherein, after determining that the second processor has failed, the first processor configures the bridge, the second host adaptor, and the second device adaptor to communicate with the first processor, and wherein after configuration in response to determining that the second processor has failed, an I/O request from at least one of the host systems to the second DASD is transferred via the second host adaptor, the first processor, and the second device adaptor.

8. The storage controller of claim 7, wherein the bridge is further comprised of a first bridge that provides communication between the host adaptors and the processors and a second bridge that provides communication between the processors and the device adaptors.

9. The storage controller of claim 7, further including:
a non-volatile storage unit (NVS) in the first device adaptor, wherein the NVS buffers data written to the first DASD;
an NVS in the second device adaptor, wherein the NVS buffers data written to the second DASD.

10. A storage controller to interface between a plurality of host systems and direct access storage devices (DASDs), comprising:

(a) means, performed by a first processor, for configuring a first host adaptor and a first device adaptor to communicate with a first processor;

(b) means, performed by a second processor, for configuring a second host adaptor and a second device adaptor to communicate with a second processor;

(c) bridge means for interfacing the first processor, the first host adaptor, and the first device adaptor and for interfacing the second processor, the second host adaptor, and the second device adaptor;

(d) a first DASD linked to the first device adaptor, wherein an input/output (I/O) request from at least one of the host systems is directed to the first DASD via the first host adaptor, the first processor, and the first device adaptor;

(e) a second DASD linked to the second device adaptor, wherein an I/O request from at least one of the host systems is directed to the second DASD via the second host adaptor, the second processor, and the second device adaptor;

(f) means, performed by the first processor, for determining whether the second processor has failed; and (g) means, performed by the first processor, for configuring the bridge means, the second host adaptor, and the second device adaptor to communicate with the first processor upon determining that the second processor has failed, wherein after configuration in response to determining that the second processor has failed, an I/O request from at least one of the host systems to the second DASD is transferred via the second host adaptor, the first processor, and the second device adaptor.

11. The storage controller of claim 10, further comprising means, performed by the first processor, for configuring the bridge means to block communication between the second processor and the bridge upon determining that the second processor has failed.

12. The storage controller of claim 10, further including:

means, performed by the first processor, for determining whether the first device adaptor has failed when at least one of the host systems directs a request toward the first DASD; and means for generating a message to at least one of the host systems directing a request toward the first DASD to be communicated via the failed first device adaptor indicating that the first DASD is inaccessible after determining that the first device adaptor has failed.

13. The storage controller of claim 10, wherein a host system is linked to the first host adaptor via a dual bus host, and further including:

means, performed by the host system, for determining whether the first host adaptor is inaccessible; and means, performed by the host system, for directing the request to another host adaptor attached to the dual bus host upon determining that the first host adaptor is inaccessible.

14. The storage controller of claim 10, wherein the first DASD comprises a group of at least one DASD and the second DASD comprises a group of at least one DASD, further including:

means, performed by the first processor, for mapping data in the first group of DASDs to a format that at least one of the host systems interprets as first a logical unit number (LUN);

means, performed by the second processor, for mapping data in the second group of DASDs to a format that at least one of the host systems interprets as a second LUN;

means for directing data from at least one of the host systems to the first processor via the first host adaptor and the bridge means, wherein the first processor maps the data routed thereto to an addressable area in the first group of DASDs; and means for directing data from at least one of the host systems to the second processor via the second host adaptor and bridge means, wherein the second processor maps the data routed thereto to an addressable area in the second group of DASDs, wherein after configuration in response to determining that the second processor has failed, an I/O request from at least one of the host systems to the second group of DASDs is routed via the second host adaptor to the first processor, wherein the first processor maps the data directed to the second groups of DASDs to the addressable area in the second group of DASDs.

15. An article of manufacture for use in programming a storage controller to direct data between a plurality of host systems and direct access storage devices (DASDs), the article of manufacture comprising a storage medium having logic embodied therein that causes components of the storage controller to perform the steps of:

(a) configuring a bridge, a first host adaptor, and a first device adaptor to communicate with a first processor, wherein a first DASD is linked to the first device adaptor, and wherein the bridge provides communication among the first processor, the first host adaptor, and the first device adaptor;

(b) configuring the bridge, a second host adaptor, and a second device adaptor to communicate with a second processor, wherein a second DASD is linked to the second device adaptor, and wherein the bridge provides communication among the second processor, the second host adaptor, and the second device adaptor;

(c) directing an input/output (I/O) request from at least one of the host systems to the first DASD via the first host adaptor, the first processor, and the first device adaptor;

(d) directing an I/O request from at least one of the host systems to the second DASD via the second host adaptor, the second processor, and the second device adaptor;

(e) determining whether the second processor has failed; and (f) configuring with the first processor the bridge, the second host adaptor, and the second device adaptor to communicate with the first processor in response to determining that the second processor has failed, wherein after configuration in response to determining that the second processor has failed, an I/O request from at least one of the host systems to the second DASD is transferred via the second host adaptor, the first processor, and the second device adaptor.

16. The article of manufacture of claim 15, further causing the first processor to perform the step of configuring the bridge to block communication between the second processor and the bridge upon determining that the second processor has failed.

17. The article of manufacture of claim 15, wherein the first and second device adaptors each include a non-volatile storage unit (NVS) and further causing the storage controller to buffer data written to the first DASD in the NVS within the first device adaptor and buffer data written to the second DASD in the NVS within the second device adaptor.

18. The article of manufacture of claim 15, further causing the components of the storage controller to perform the steps of:

determining whether the first device adaptor has failed when at least one of the host systems directs a request toward the first DASD; and generating a message to at least one of the host systems directing a request toward the first DASD to be communicated via the failed first device adaptor indicating that the first DASD is inaccessible after determining that the first device adaptor has failed.

19. The article of manufacture of claim 15, wherein the first DASD comprises a first group of at least one DASD and the second DASD comprises a second group of at least one DASD, further causing the components of the storage controller to perform the steps of:

mapping, with the first processor, data in the first group of DASDs to a format that the host system interprets as a first logical unit number (LUN);

mapping, with the second processor, data in the second group of DASDs to a format that the host system interprets as a second LUN;

directing data from at least one of the host systems to the first processor via the first host adaptor and the bridge, wherein the first processor maps the data routed thereto to an addressable area in the first group of DASDs;

directing data from at least one of the host systems to the second processor via the second host adaptor and bridge, wherein the second processor maps the data routed thereto to an addressable area in the second group of DASDs, wherein after configuration in response to determining that the second processor has failed, an I/O request from at least one of the host systems to the second group of DASDs is routed via the second host adaptor to the first processor, wherein the first processor maps the data routed to the second group of DASDs to the addressable area in the second group of DASDs.

* * * * *

UNITED STATES PATENT AND TRADEMARK OFFICE
CERTIFICATE OF CORRECTION

PATENT NO. : 6,061,750
DATED : May 9, 2000
INVENTOR(S) : Brent Cameron Beardsley, Matthew Joseph Kalos and Ronald Robert Knowlden It is certified that error appears in the above-identified patent and that said Letters Patent is hereby corrected as shown below:

Column 1,
Line 55, delete "3system" and insert -- 3 system --.

Column 4,
Line 25, delete "[PCI to PCI]".

Column 5,
Lines 64 and 65, delete "24a, b" and insert -- 24a, b. --.

Column 6,
Line 44, delete [PCI to PCI]".

Signed and Sealed this

Seventh Day of September, 2004

JON W. DUDAS
*Director of the United States Patent and Trademark Office*